Aug. 2, 1955

C. E. BIEBER ET AL 2,714,699

MOTOR OPERATED TWO-STATION ANGULAR-MOVEMENT ACTUATOR

Filed Aug. 17, 1954

INVENTORS:
Charles E. Bieber
and
BY Robert S. Carr

Robert Henderson
ATTORNEY

Aug. 2, 1955  C. E. BIEBER ET AL  2,714,699
MOTOR OPERATED TWO-STATION ANGULAR-MOVEMENT ACTUATOR
Filed Aug. 17, 1954                                    4 Sheets-Sheet 2
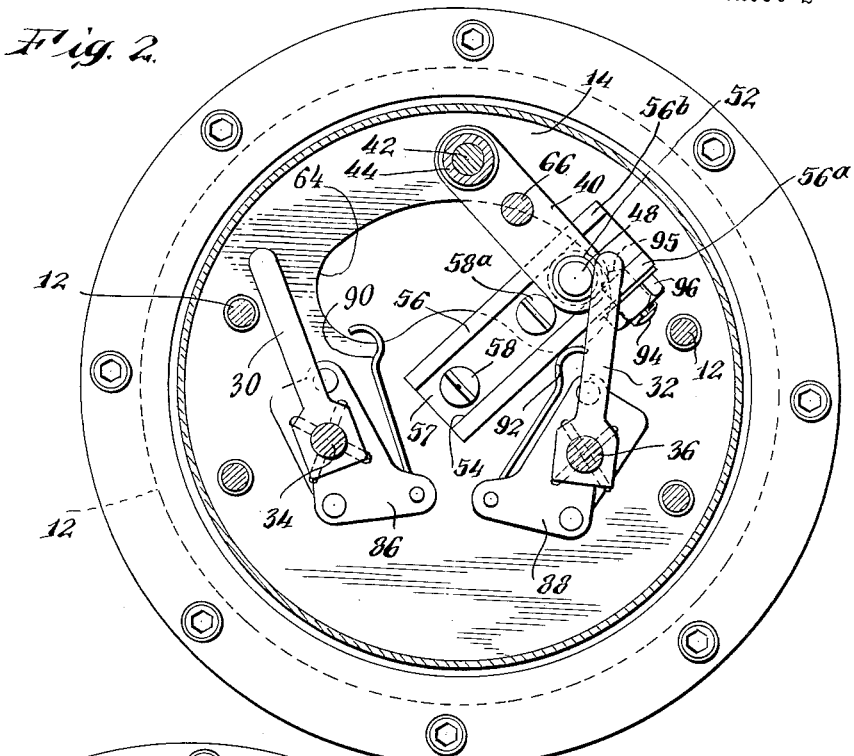
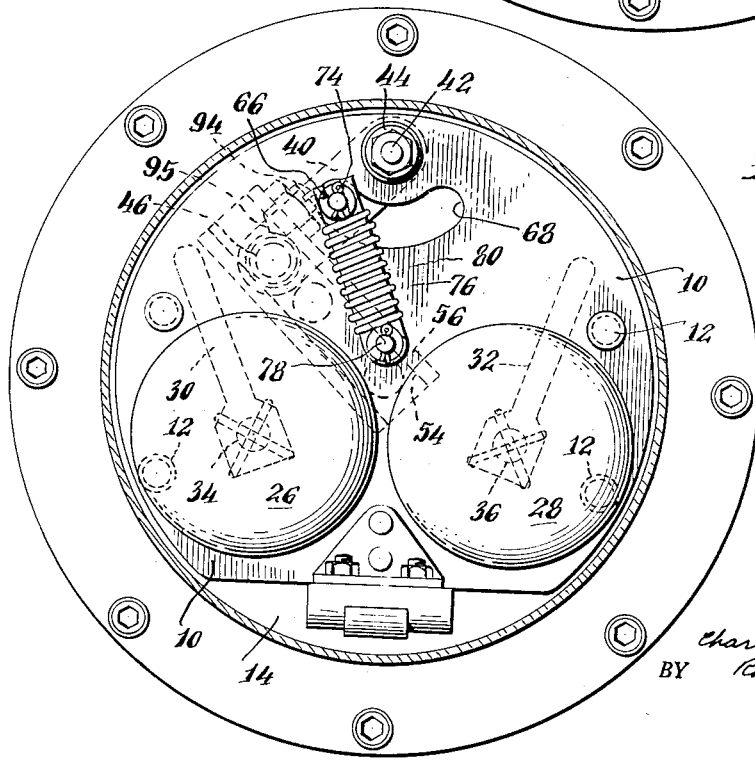
INVENTORS:
Charles E. Bieber
and
BY  Robert S. Carr
Robert Henderson
ATTORNEY.

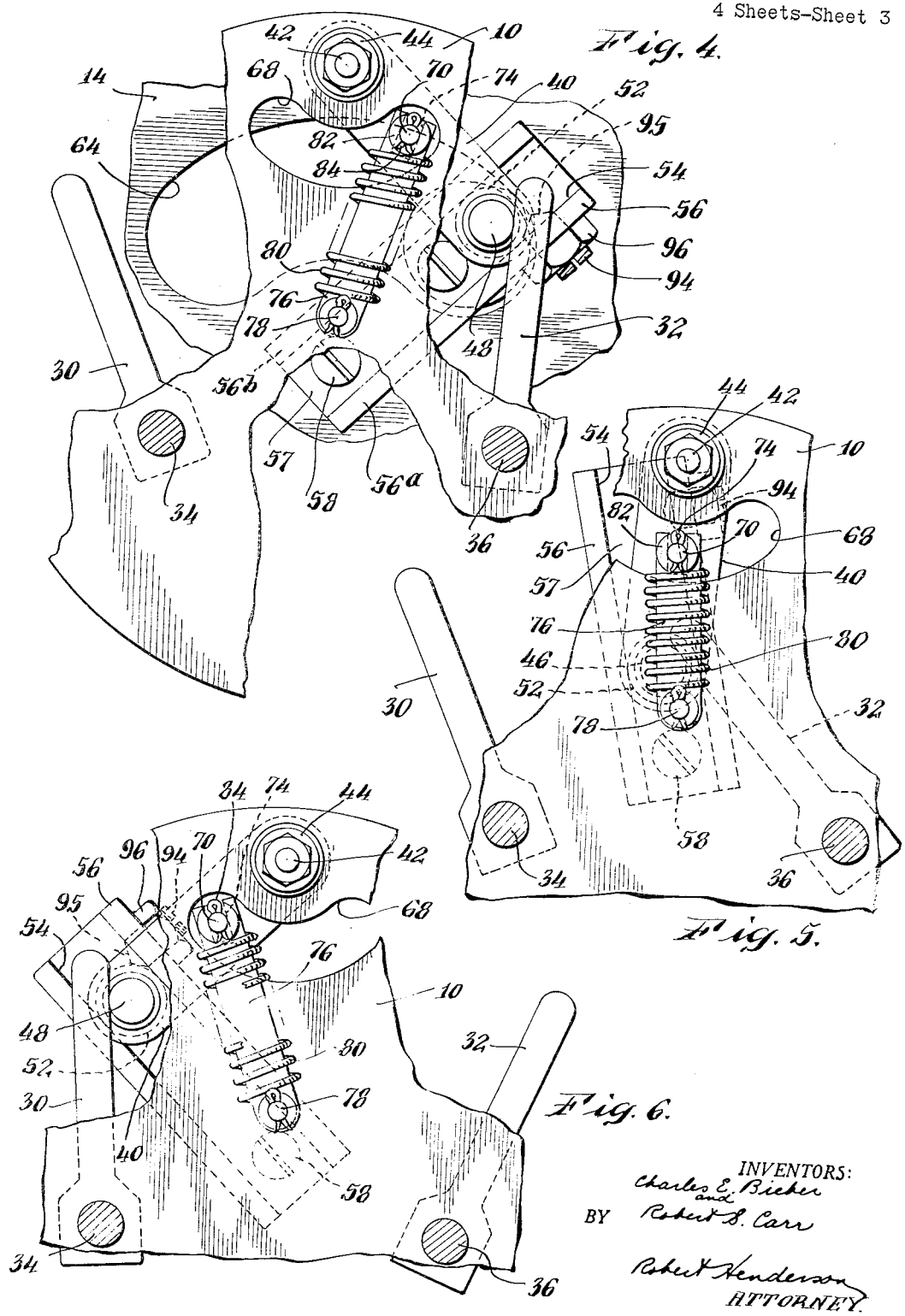

United States Patent Office 2,714,699
Patented Aug. 2, 1955

2,714,699
MOTOR OPERATED TWO-STATION ANGULAR-MOVEMENT ACTUATOR

Charles E. Bieber, Elizabeth, and Robert S. Carr, Summit, N. J., assignors to Airtron, Inc., Linden, N. J., a corporation of New Jersey Application August 17, 1954, Serial No. 450,467

7 Claims. (Cl. 318—467)

This invention relates to improved means for imparting angular movement to an element between two precise positions and, more particularly, to such means which may more effectively accomplish and precisely control such movement.

An important object of this invention, therefore, is to provide such means in the form of a device which operates very rapidly, which avoids rebound at each terminus of angular movement and which resists vibration and shock while at rest.

Another important object is to provide such a device which is electrically operated and includes electric controls which are responsive to movement of a part of the device to terminate or reverse the latter's operation.

The foregoing and other more or less obvious objects are accomplished by this invention of which two embodiments are disclosed herein, for illustrative purposes without, however, limiting the invention to those two embodiments.

In the accompanying drawings:

Figure 2 is a transverse sectional view substantially on the line 2—2 of Fig. 1.

Figure 3 is a transverse sectional view substantially on the line 3—3 of Figure 1.

Figures 4, 5 and 6 are fragmentary, phantom views respectively showing certain inter-acting parts of the device at the beginning, intermediate and end parts of their movements which occur incidental to movement of an element actuated by the device between two angularly related positions.

Figure 1:
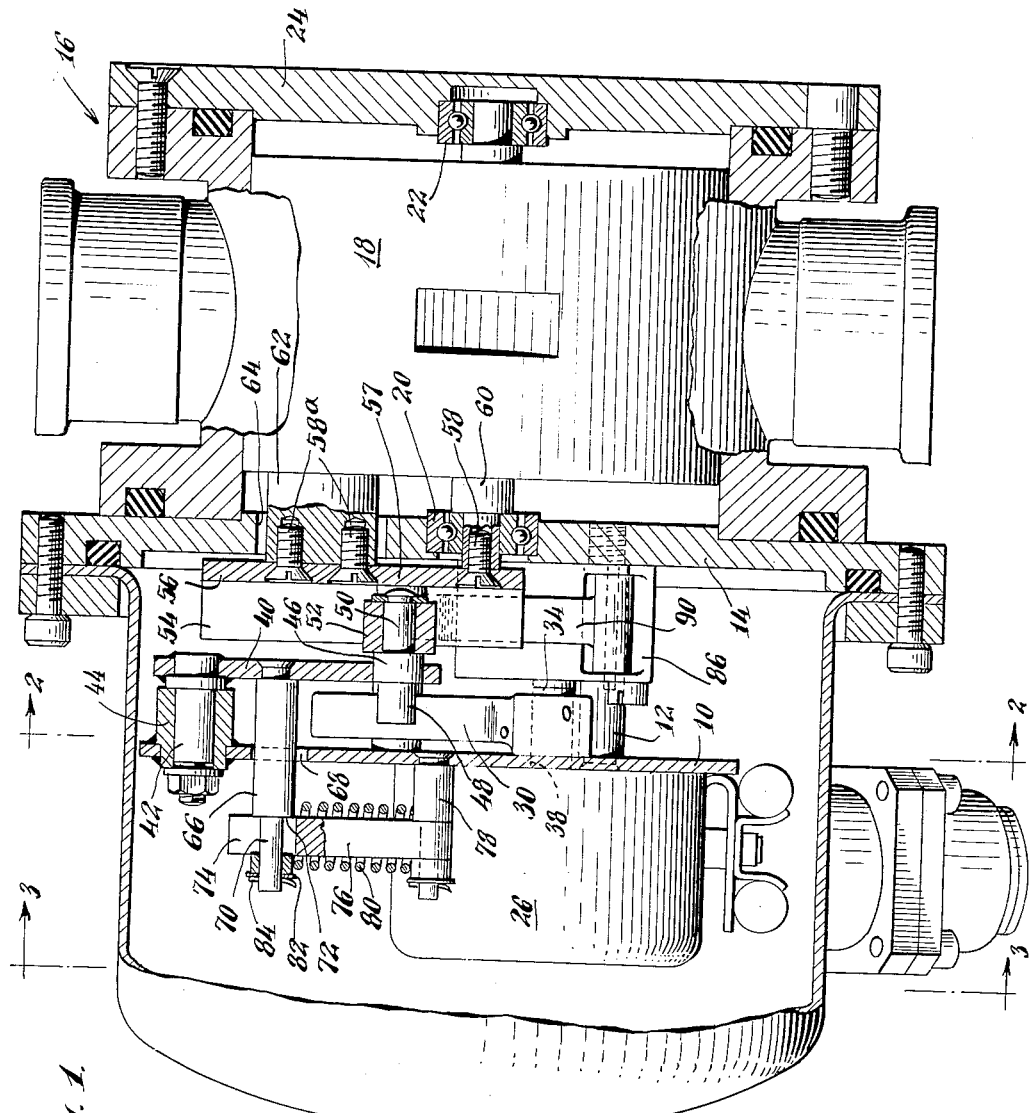
Figure 1 is an approximately central, axial, sectional view of a device according to a preferred or first embodiment of this invention, in association with an element to which it imparts angular movement.

The actuators disclosed herein as illustrative of the invention are shown in the drawings and described as associated with a wave guide switch such as may be employed to switch microwave electrical energy between two circuits; the actuators being adapted to shift a switch rotor between two circuit-controlling positions.

The actuator illustrated in Figures 1-6 includes a substantially circular mounting plate 10, held by plural studs 12 (only one being indentified in Figure 1) in spaced parallelism to the exterior of an end plate 14 of a wave guide switch 16 having a rotary switching element 18 supported for rotation about a horizontal axis, as viewed in the drawings, in bearings 20, 22 in the end plate 14 and an opposite end plate 24 of the switch.

Two similar but oppositely acting rotary solenoids 26, 28 are suitably fixed upon the outer face of plate 10, and said solenoids have operating arms 30, 32 (one for each solenoid) inwardly of plate 10, non-rotatably fixed on oscillatable shafts 34, 36 of said solenoids, which extend through and turn freely in suitable openings 38 in plate 10. The solenoid arms are yieldably held in their extreme outermost positions shown in Figure 3 by springs and stops, not shown, which may be incorporated into the solenoids; and the electric circuits through the solenoids are such that when either of the latter is electrically energized, its operating arm swings inwardly against the force of such springs, as may be understood from Figures 4-6.

A drive arm 40 is pivoted at its upper end by a pivot pin 42 within a bushing or bearing 44 welded to the plate 10 near the top and center of the latter. At its lower end the drive arm 40 has an axially extending driving stud 46 fixed thereinto. This stud has an outwardly extending nose 48 lying between the two solenoid arms 30 and 32 to be engaged by said arms alternately to swing the drive arm 40 from side to side, and also has an inner extension 50, preferably having thereon an antifriction roller 52 which extends with a close, rolling fit within a channel 54 of a channel bar 56 which is secured at its base web 57 to rotor 18 in radial relation to the latter by screws, one of which, numbered 58, is shown as threaded coaxially into a stub shaft 60 of said rotor and others of which, numbered 58a, are shown as threaded into a lug 62 suitably fixed to or formed upon said rotor at an eccentric point thereof and extending freely through an arcuate slot 64 in end plate 14 of the switch. This slot is curved about a center corresponding to the axis of rotation of rotor 18 so that the latter is free to reciprocate within the limits of movement of the lug 62 in said slot.

The drive arm 40 also has a toggle stud 66, rigidly fixed into said arm at an intermediate point thereof and extending outwardly through an arcuate slot 68 formed in mounting plate 10 in an arc the curvature of which has pivot pin 42 as a center. The outer end of stud 66 is reduced at 70 and shouldered at 72, and said reduced end extends slidably within a straight longitudinal slot 74 at the upper end of a pivotal spring-guide arm 76, pivoted upon a stud 78 which is rigidly fixed into mounting plate 10 at a point in the latter coincident with a straight line extending between the axes of oscillation of drive arm 40 and channel bar 56.

Extending about arm 76 is a coil spring 80, compressed between stud 78 and toggle stud 66, and this spring, held against buckling by guide arm 76, forms a yieldable toggle link which functions to afford a toggle action with the upper portion of drive arm 40 in a manner hereinafter described. A washer 82, held onto the end of stud 66 by a cotter pin 84, may be used to hold arm 76 against disassociation from stud 66 and a similar washer and cotter pin arrangement or equivalent means may hold the arm 76 against disassociation from stud 78.

It may be observed from Figures 2-6 that the centers of oscillation of the channel bar 56, the drive arm 40 and the spring-guide arm 76 are all coincident with a single straight line and that each of said bar and arms swings similarly to opposite sides of said straight line; also that the solenoid arms 30 and 32 have centers of oscillation which are symmetrical with respect to the same straight line but operate at different times and in opposite directions in the operation of the device. The two arcuate slots 64 and 68 extend equally at opposite sides of said straight line sufficiently to permit operation as hereinafter described. Because of this symmetry of said parts and operations relatively to said straight line, the latter is sometimes hereinafter referred to as "dead center."

The two solenoids 28, 26, in a preferred mode of operation, are controlled by two separate electric circuits, each including a normally closed limit switch shown as so-called micro-switches 86, 88 which, respectively, have switch arms 90, 92 either of which when engaged and pressed, as hereinafter described, will open its related micro-switch and, when released, will permit said microswitch to close. These switches may be suitably fixed, either upon the wave guide switch's end plate 14, as shown in Figure 1, or upon the actuator's mounting plate 10, in such positions that their switch arms may be engaged alternately by channel bar 56 (as shown in the drawings) or by some other moving member such as drive arm 40 which moves in unison with the channel bar.

The outer end of channel 54 may be closed to form a stop to limit the outward movement of roller 52 therein and thereby limit the outward swing of drive arm 40 in either direction; or, preferably, an adjustable stop may be provided to limit such outward movements. Thus, an adjusting screw 94, having a conical end 95, may be threaded through a side wall 56a (Figure 2) of the channel bar 56 so that its conical end forms, with the opposite side wall 56b of the channel bar, an angular abutment to engage and limit the outward movement of the roller 52 in the channel 54. The outer end of screw 94 may have a locknut 96 thereon to lock said screw in adjusted position. The disclosed adjusting means permits very fine adjustment of the extremes to which the actuator may function so that the actuated rotor of the wave guide switch, or equivalent oscillatable member, may be moved to precise desired positions.

When channel bar 56 is at its extreme rightward position as shown in Figures 2 and 4, the rotary switch element 18 is in one of its two switching positions, and when said channel bar is in its extreme leftward position as in Figure 6, the switch element 18 is in its other switching position; hence, the manner in which the present actuator operates the wave-guide switch element 18, or other somewhat similar, angularly shiftable member, may be comprehended by understanding the manner in which said channel bar is operated.

Although the operation of the actuator may be gathered from the foregoing description, the following description of a preferred mode of operation may afford a better understanding of the invention.

At the commencement of a cycle of operation, it may be assumed that rotary switch element 18 is in its extreme clockwise position as viewed from the actuator or i. e. as bar 56 is viewed in Figures 2 and 4 so that the switch element 18 is in a precise angular position to switch microwave electrical energy between two conducting lines controlled by the wave guide switch. This clockwise switch position corresponds, of course, to the Figure 2 angular position of channel bar 56 which, as already explained, is fixed to and turns with the switch element 18. At that time, both solenoids 26 and 28 are de-energized and their arms 30 and 32 are in their positions shown in Figure 3; and all other operating parts are in their positions shown in Figures 2 and 4.

It being desired to angularly shift the switch element 18 counter-clockwisely, a remote electric switch (not shown) is closed and held closed for a short time to establish an electric circuit through then closed microswitch 86 and through the coil of solenoid 28. When solenoid 28 is thus energized, its arm 32 moves counter-clockwisely to first engage nose 48 of stud 46 as in Figures 2 and 4 and then push the latter leftwardly to swing drive arm 40 leftwardly; roller 52 of the drive arm, meanwhile, carrying the channel bar 56 and switch element 18 leftwardly or counter-clockwisely.

As the drive arm 40 and channel bar 56 move leftwardly the spring guide arm 76 is moved leftwardly by toggle stud 66. During this leftward movement of the several mentioned parts to dead center, the spring 80 is being additionally compressed and after said parts pass dead center, as in Figure 5, said spring serves as a force for continuing the leftward shifting of the several mentioned parts; the spring force being applied through stud 66 to drive arm 40 and, thence, through roller 52 to channel bar 56. This spring force, advantageously, may be additive to the continuing force of the still energized solenoid 28 to achieve very rapid shifting action.

As the channel bar 56 and its related switch element 18 near their extreme leftward or counter-clockwise positions, said channel bar engages switch arm 90 and breaks the electric circuit through switch 86, thereby de-energizing solenoid 28 to permit the latter's arm 32 to be returned by its non-shown spring to its initial position as in Figure 3.

To shift switch element 18 back from its leftward to its rightward position, solenoid 26 and switch 88 function similarly but oppositely to solenoid 28 and switch 86 as just described, and parts 40, 56 and 76 function exactly oppositely to the manner just described.

Without attempting to mention all advantages of the disclosed actuator, it may be noted that it is very rapid in action and may be adjusted to achieve very precise positioning of the wave-guide switch element 18 (or equivalent actuated member); the rapidity of action arising from the snap or toggle action of spring 80 and precision position being derived from the fine adjustment possible through adjusting screw 94.

Despite the snap or toggle action which facilitates rapid action and a resultant tendency of drive arm 40 to bounce or vibrate at the end of each angular movement, that tendency is not realized to any material degree. Possible bounce is minimized or obviated by reason of the fact that spring 80 firmly holds drive arm 40 in either extreme position. However, if some slight bounce of arm 40 should occur, the bounce or vibration of the latter would cause only a slight movement of roller 52 in a curved line tangential to the channel 54, which slight movement could not cause any perceptible or material movement of channel bar 56 or of the switch element 18 or any equivalent member fixed to the channel bar. Thus, despite the rapid operation of the actuator, the actuated element always comes to rest at a precisely predetermined position. Also the same conditions, as described, which render bounce negligible and ineffective, assure that shock or vibrations to which the device might be subjected, will not impair the capacity of the device to hold an actuated element in a precise position at each end of its range of movement.

Although the described electrical control arrangement is advantageous in its facility for integration with electric controls of other related apparatus and for preventing excessive durations of energization of the two solenoids, it will be understood that a variation of this invention could involve omission of the switches 86 and 88, in which variation the remote control switch would be held closed only until an energized solenoid had achieved the desired movement of parts, as described, just beyond dead center.

Figure 7:
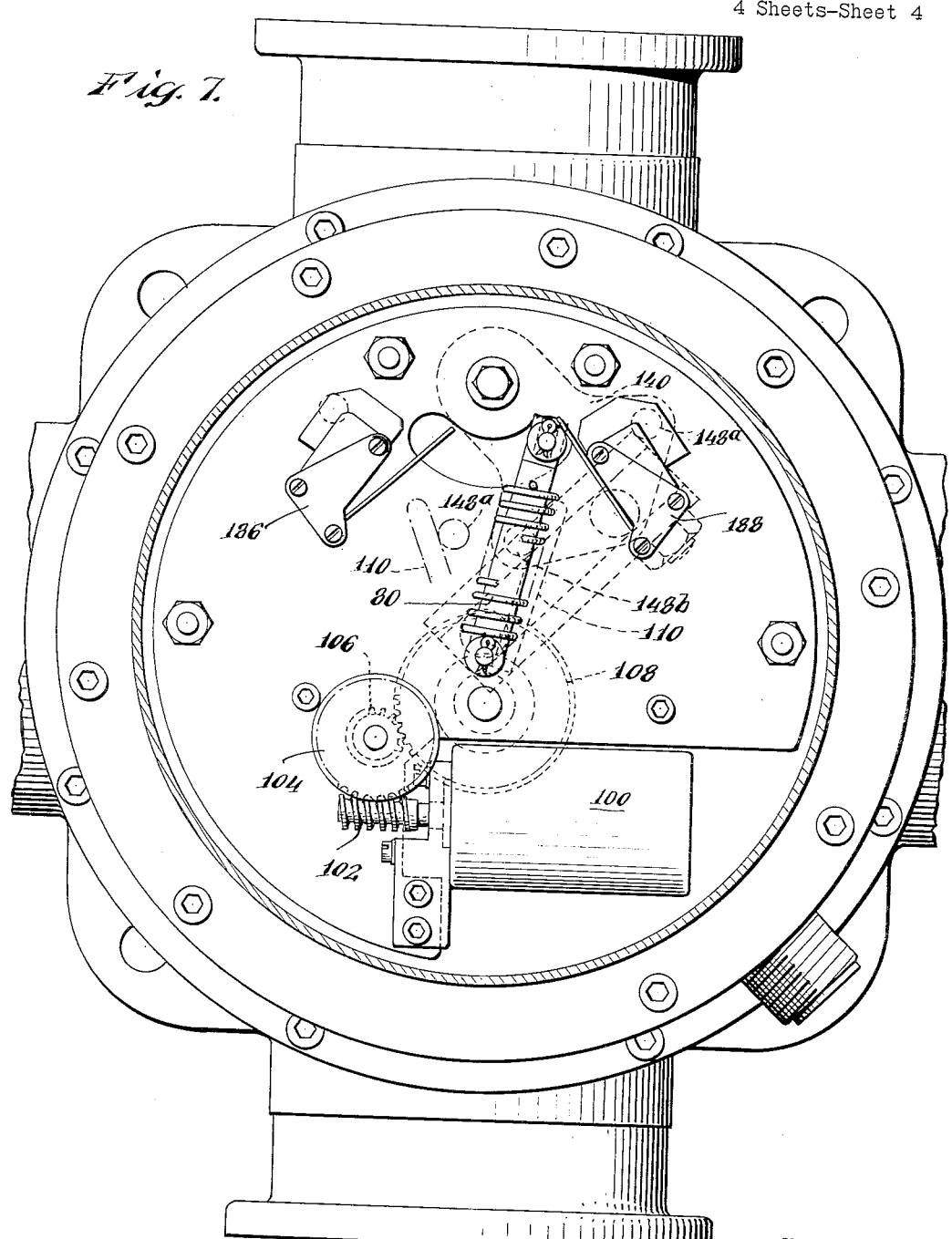
Figure 7 is a view, somewhat similar to Figure 3, but showing another or second of numerous possible embodiments of the invention.

The second embodiment illustrated in Figure 7 differs from the first described embodiment chiefly in the motive means for moving certain parts of the device, and the element actuated, beyond dead center. Instead of employing two oppositely acting solenoids, the second embodiment includes a single, reversible electric motor 100 which, through a worm 102 and worm wheel 104, causes a pinion 106 on said worm wheel to turn, in opposite directions, a gear wheel 108 with which is rigidly associated an arm 110.

The arm 110 like the solenoid arms 30, 32 of the first embodiment is arranged to shift a drive plate 140 angularly in the same general manner as the solenoid arms 30, 32 of the first embodiment shift drive arm 40; and the drive plate 140 functions similarly to drive arm 40 to achieve complete operation as previously described. In the second embodiment, however, the drive plate 140 has two fixed studs 148a and 148b at opposite sides of its front face.

Supposing the parts to be in their rightward position as shown in Figure 7 and that arm 110 also is toward the right; starting of motor 100 in the direction to move arm 110 leftwardly will cause the latter to engage stud 148b and move plate 140 leftwardly past dead center whereupon toggle spring 80 will cause completion of leftward movement of the parts of the device to bring about complete counter-clockwise shifting of an actuated wave-guide switch element or equivalent element, in the same manner and by means similar to those disclosed in the first embodiment. Subsequent reverse operation of motor 100 will cause arm 110 to push stud 148a (then in its position shown in dot-and-dash lines in Figure 7) rightwardly to reverse the operation of plate 140 and the other parts which the latter drive.

In the second embodiment, it is quite important to utilize switches 186 and 188, functioning like switches 86 and 88, to control reversing circuits through motor 100 to assure stopping of said motor when actuation of a related wave-guide switch element or equivalent element has been completed in either direction.

It should be apparent, from the foregoing, that the disclosed inventive concept may be utilized in numerous ways other than those illustrated and described herein without, however, departing from the invention as set forth in the following claims:

We claim:

1. A two-station, angular-movement actuator comprising two swingable members arranged to move angularly in intersecting arcs about spaced centers of such angular movement, one of said members being rigidly fixed to an element to be actuated and the two said members having slidably inter-engaging portions constraining them to swing in unison, means for initially, angularly moving said swingable members past dead center corresponding to a straight line coincident with their said centers of movement, and separate means, coacting with said members to move the latter positively beyond said dead center; said slidably interengaging portions being a channel portion of one of said members and a stud on the other member extending into said channel portion, said channel portion having an adjustable abutment adapted to limit the sliding movement of said stud in the channel portion and thereby limit the angular movement of said two swingable members, and said abutment being an adjusting screw threadably extending through a side of said channel portion and into the latter and having a tapered inner end providing, with an opposite side of said channel portion, an acute angular abutment to engage said stud to limit the latter's movement in the channel portion.

2. A two-station, angular-movement actuator comprising two swingable members arranged to move angularly in intersecting arcs about spaced centers of such angular movement, one of said members being rigidly fixed to an element to be actuated and the two said members having slidably interengaging portions constraining them to swing in unison, means for initially, angularly moving said swingable members past dead center corresponding to a straight line coincident with their said centers of movement, and separate means, coacting with said members to move the latter positively beyond said dead center; said means for initially, angularly moving said swingable members comprising oppositely acting motive means, arm means coacting with said motive means to derive opposite actuation therefrom and stud means on one of said swingable members and in the path of movement of said arm means to adapt said swingable members to be angularly moved by said arm means.

3. An actuator according to claim 2, further characterized in that said motive means comprise a pair of oppositely acting electric solenoids.

4. An actuator according to claim 2, further characterized in that said motive means comprise a pair of oppositely acting electric solenoids, that said arm means comprise a pair of solenoid arms each actuated by a different one of said solenoids, and that said stud means comprise a single stud, in one of said swingable members, arranged to be alternately engaged by said solenoid arms to swing said swingable members toward opposite extreme positions.

5. An actuator according to claim 2, further characterized in that said motive means comprise a reversible motor.

6. An actuator according to claim 2, further characterized in that said motive means comprise a reversible motor, a single motor arm, constituting said arm means, reversibly actuated by said motor, and in that said stud means comprise a pair of studs symmetrically disposed at opposite sides of one face of one of said swingable members, the two studs being adapted to coact alternately with said motor arm to cause movement of said swingable members in opposite directions.

7. An actuator according to claim 2, further characterized in that said motive means are electrical and in including a pair of electric switches each operative for controlling said motive means for operation in a different direction and each adapted to be operated to deactivate said motive means at the end of the movement of said swingable members in the direction which said switch controls.

References Cited in the file of this patent

UNITED STATES PATENTS

| | | |
|---|---|---|
| 659,946 | Whittingham | Oct. 16, 1900 |
| 1,849,327 | Huber | Mar. 15, 1932 |
| 2,500,853 | Moses | Mar. 14, 1950 |